(No Model.)
H. WINTER.
HAND SAW ATTACHMENT.
No. 275,559. Patented Apr. 10, 1883.
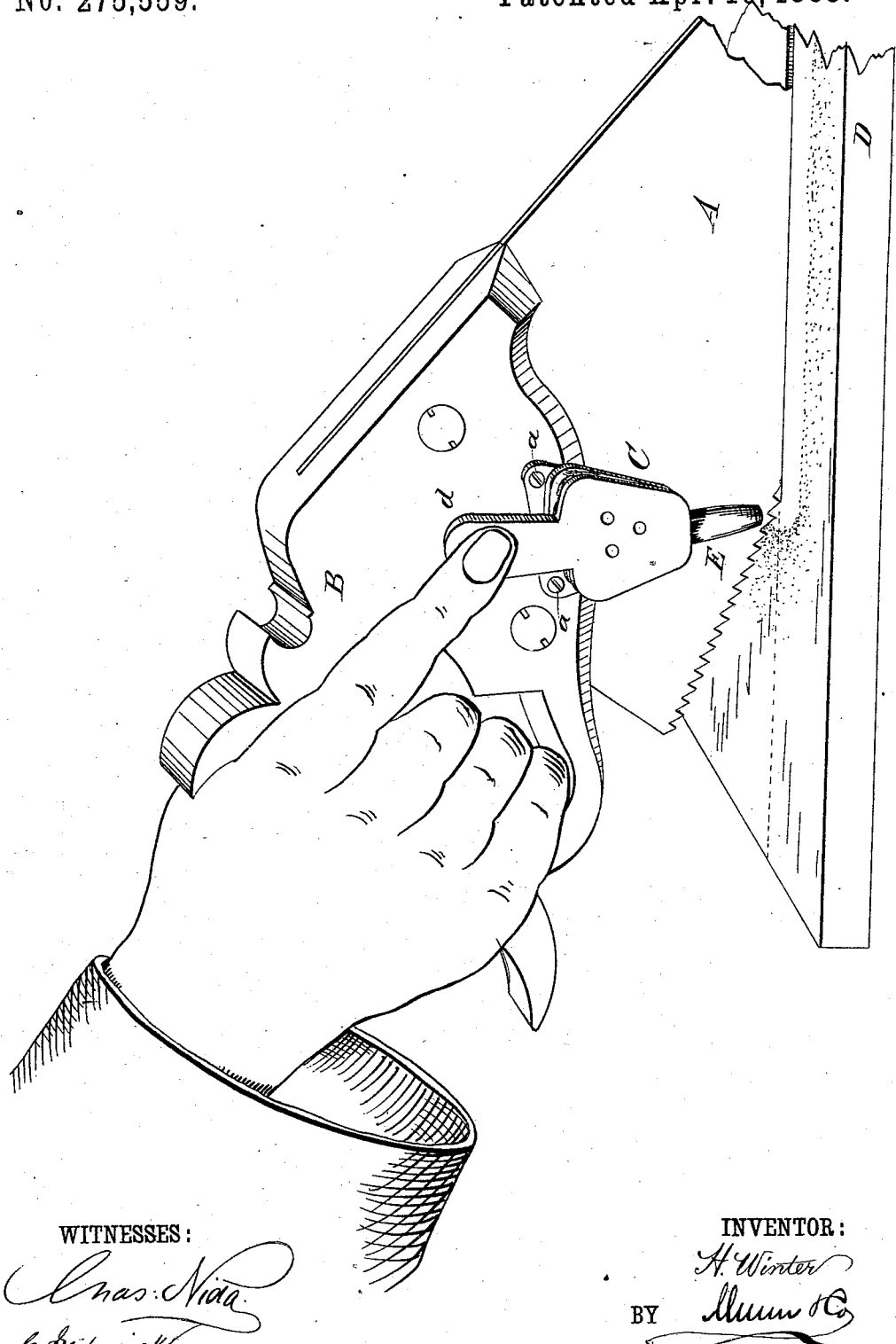
WITNESSES:
INVENTOR:
BY
ATTORNEYS.

UNITED STATES PATENT OFFICE.

HENRY WINTER, OF HANOVER, ILLINOIS.

HANDSAW ATTACHMENT.

SPECIFICATION forming part of Letters Patent No. 275,559, dated April 10, 1883.

Application filed January 23, 1883. (No model.)

*To all whom it may concern:*

Be it known that I, HENRY WINTER, of Hanover, in the county of Jo Daviess and State of Illinois, have invented a new and Improved Handsaw Attachment, of which the following is a full, clear, and exact description.

My invention consists of my particular means for forcing a current of air down upon the board or other object being sawed, for clearing away the sawdust from in front of the saw for preventing the same from covering up or obscuring the line or mark being followed in sawing.

Reference is to be had to the accompanying drawing, forming part of this specification, in which the figure is a perspective view of my improved handsaw and the method of using it.

In carrying out my invention I attach a small pair of bellows or other air-forcing device to the handle of the saw in such manner that the same will be operated either in the act of operating the saw or by the movement of one of the fingers of the hand of the user that grasps the saw.

Various means for the attachment of an air-forcing device to the saw might be devised; but I prefer to attach the bellows C to the handle B of the saw A by the screws $a\ a$, and to extend the bar $d$ of the bellows upward, so that the bellows may be conveniently operated by the forefinger of the user, as illustrated in the drawing. The exit-pipe E of the bellows is carried down near to the teeth of the saw, so that the current of air forced from the bellows will strike the surface of the board D at or about the point where the saw-teeth rest in contact with the board, so that it will clear away the sawdust at that point, so that the line or mark being followed in sawing will not be covered up or obscured by the sawdust. In this manner it will be seen that the annoyance incident to the covering up of the line or mark being followed is entirely overcome without any loss of time or trouble on the part of the person using the saw.

I am aware that it is not new to use an air-cylinder and piston, the former having an outlet pointing to the heel of the handsaw and the latter having a stem which strikes the wood which is being sawed; but What I do claim as new is—

A handsaw provided with the bellows C, attached to its handle B, having the extension-bar $d$ arranged upwardly within easy reach of the finger of an operator and provided with an air-discharge nozzle projecting toward the teeth, as shown and described.

HENRY WINTER.

Witnesses:
J. W. WHITE,
A. B. WHITE.